United States Patent
Bennett et al.

(10) Patent No.: US 6,543,255 B2
(45) Date of Patent: Apr. 8, 2003

(54) PRESS BENDING STATION AND METHOD FOR JOB SWITCHING

(75) Inventors: Terry A. Bennett, Northwood, OH (US); Paul D. Ducat, Perrysburg, OH (US)

(73) Assignee: Glasstech, Inc., Perrysburg, OH (US)

( * ) Notice: Subject to any disclaimer, the term of this patent is extended or adjusted under 35 U.S.C. 154(b) by 42 days.

(21) Appl. No.: 09/884,847

(22) Filed: Jun. 19, 2001

(65) Prior Publication Data

US 2002/0189295 A1 Dec. 19, 2002

(51) Int. Cl.[7] ............................................. C03B 23/03
(52) U.S. Cl. ............................. 65/106; 65/173; 65/287; 65/289; 65/370.1
(58) Field of Search .................... 65/104, 106, 173, 65/287, 289, 361, 370.1

(56) References Cited

U.S. PATENT DOCUMENTS

| 3,615,338 A | 10/1971 | Boyles |
| 3,881,906 A | 5/1975 | Ritter, Jr. et al. |
| 3,951,634 A | 4/1976 | Hall et al. |
| 4,119,427 A | 10/1978 | Revells |
| 4,139,359 A | 2/1979 | Johnson et al. |
| 4,218,232 A | 8/1980 | Wilhelm |
| 4,226,608 A | 10/1980 | McKelvey |
| 4,236,907 A | 12/1980 | Mairlot |
| 4,305,746 A | 12/1981 | Hagedorn et al. |
| 4,312,661 A | 1/1982 | Hagedorn et al. |
| 4,396,410 A | 8/1983 | Hagedorn et al. |
| 4,493,724 A | 1/1985 | Schwarzenberg et al. |
| 4,496,386 A | 1/1985 | Hymore et al. |
| 4,508,556 A | 4/1985 | Bennett et al. |
| 4,540,426 A | 9/1985 | Bocelli et al. |
| 4,556,406 A | 12/1985 | Kahle |
| 4,557,745 A | * 12/1985 | Halberschmidt et al. ....... 65/104 |
| 4,586,946 A | 5/1986 | Kramer et al. |
| 4,872,898 A | 10/1989 | Enk et al. |
| 4,883,527 A | * 11/1989 | McMaster et al. ............ 65/104 |
| 4,992,088 A | 2/1991 | Sassanelli et al. |
| 5,009,693 A | 4/1991 | Freidel et al. |
| 5,059,233 A | * 10/1991 | Miihkinen et al. ............ 65/104 |
| 5,246,477 A | 9/1993 | Kramer |
| 5,292,356 A | 3/1994 | Herrington et al. |
| 5,368,625 A | 11/1994 | Mizusugi |
| 5,545,245 A | 8/1996 | Mizusugi |
| 5,656,055 A | 8/1997 | Frank et al. |
| 5,695,538 A | 12/1997 | Goolsbay et al. |
| 5,735,922 A | 4/1998 | Woodward et al. |
| 5,743,931 A | * 4/1998 | Flaugher et al. .............. 65/106 |
| 5,833,729 A | 11/1998 | Meunier et al. |
| 5,849,056 A | 12/1998 | May et al. |
| 5,906,668 A | * 5/1999 | Mumford et al. ........... 425/186 |
| 5,992,180 A | 11/1999 | Tsuchiya et al. |

FOREIGN PATENT DOCUMENTS

FR        2 221 409        10/1974

* cited by examiner

Primary Examiner—Sean Vincent
(74) Attorney, Agent, or Firm—Brooks & Kushman P.C.

(57) ABSTRACT

A press bending station (12) for heated glass sheets includes a lower wheel bed (36) having a lower support (38) and wheel assemblies (40) with detachable connections (46) to a drive mechanism (48) of the lower support to provide rotational driving of a wheel (44) of each wheel assembly. An actuator (62) provides relative vertical movement that lifts a heated glass sheet received by the wheel bed (36) to provide press bending thereof between a lower press ring (52) and an upper press mold (58). The wheel bed (36) can have a curved shape or a flat shape. Connection and detachment of the wheel assemblies (40) facilitates switching from one production job to the next.

12 Claims, 8 Drawing Sheets

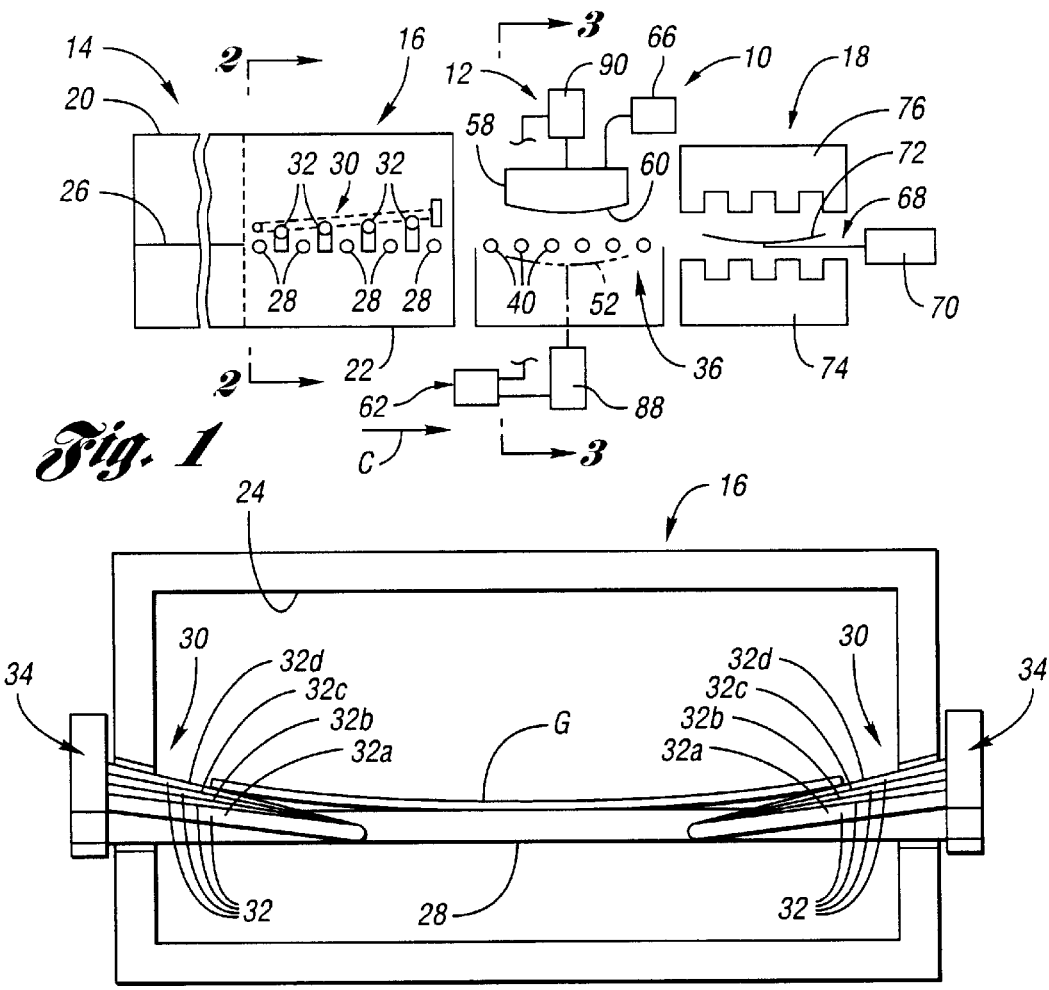
Fig. 1
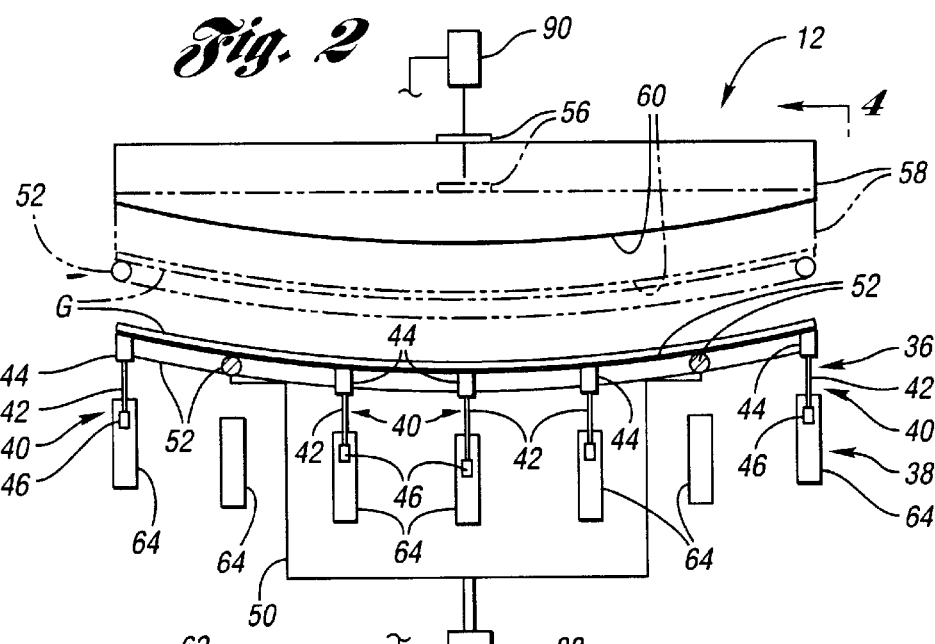
Fig. 2
Fig. 3

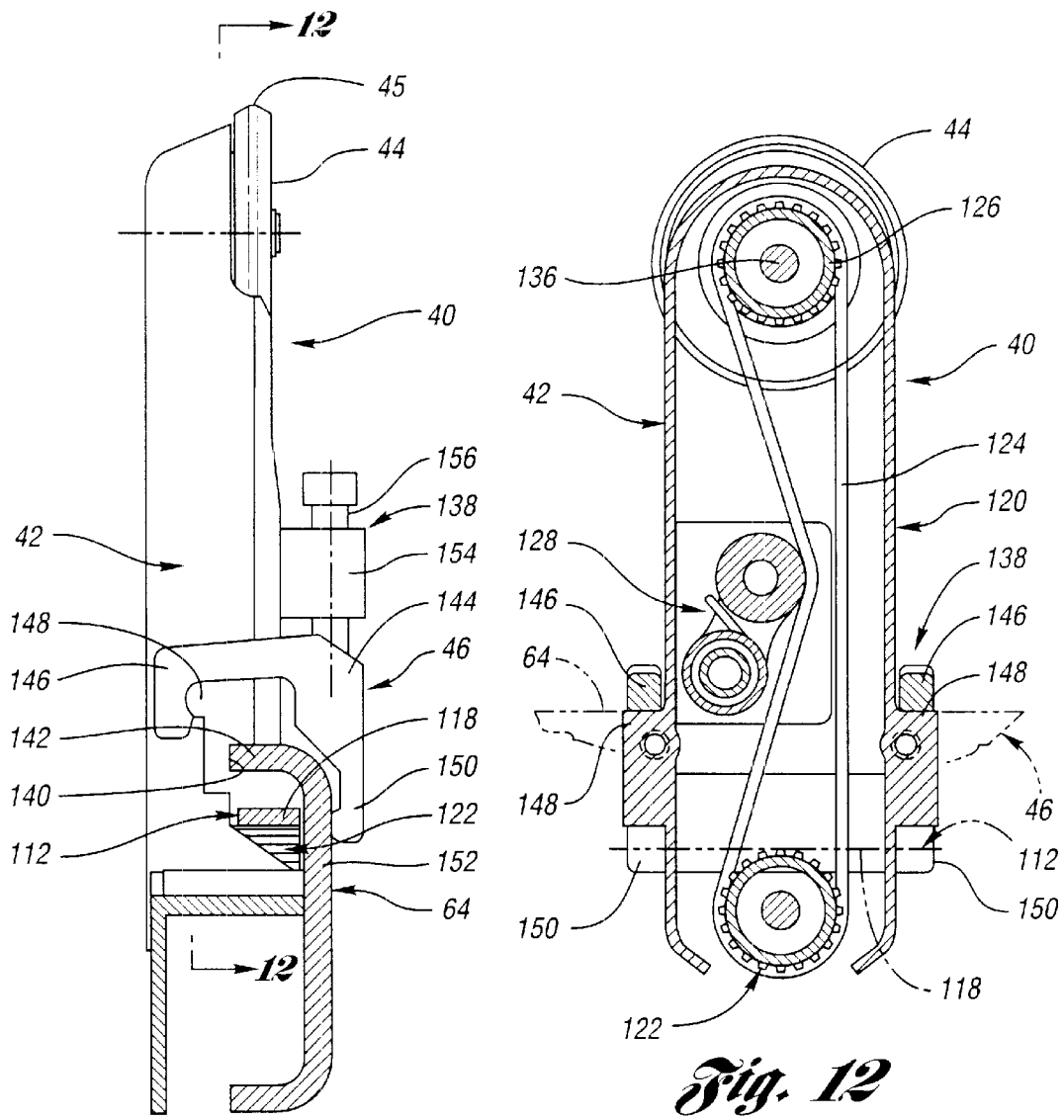
Fig. 11
Fig. 12
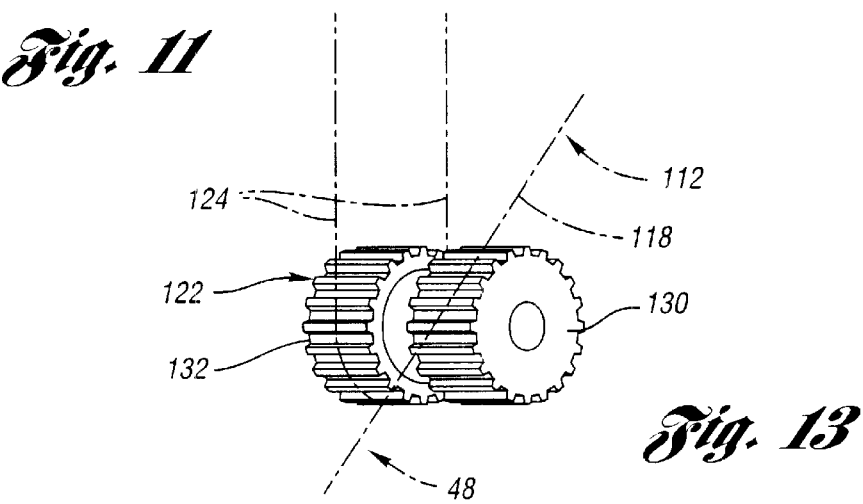
Fig. 13

PRESS BENDING STATION AND METHOD FOR JOB SWITCHING

BACKGROUND OF THE INVENTION

1. Field of the Invention

This invention relates to a heated glass sheet press bending station and also relates to a method for job switching.

2. Background Art

Glass sheet processing systems have previously included press bending stations that are located downstream from a heating furnace to provide press bending of the heated glass sheets after heating thereof to bending temperature within the furnace. The U.S. Pat. Nos. 5,368,625 Mizusugi and 5,545,245 Mizusugi disclose a glass sheet processing system having a press bending station that is located downstream from a roll bending station that is also located downstream from the associated heating furnace. These Mizusugi patents have the roll bending stations provided with horizontal rolls and laterally spaced sets of inclined rolls with the rolls of each inclined set having progressively increasing inclination along the direction of conveyance to form each heated glass sheet and to provide conveyance thereof to the press station where the glass sheet is subsequently press bent between lower and upper molds.

Roll bending of heated glass sheets has also been performed as disclosed by French Patent 2221409 of inventor Maurice Nedelec which has conveyor rolls that are supported and rotatively driven outside of a furnace heating chamber to receive a heated glass sheet prior to simultaneous tilting of the rolls to form the heated glass sheet within the heated chamber.

Upon switching from one glass sheet production job to another, the changeover time represents lost production which necessarily increases the cost of the resultant product and it is thus advantageous for such job switching to be performed as quickly as possible.

SUMMARY OF THE INVENTION

One object of the present invention is to provide an improved press bending station for press bending heated glass sheets.

In carrying out the above object, the press bending station constructed in accordance with the present invention to press bend heated glass sheets includes a lower wheel bed for receiving a heated glass sheet to be press bent. The lower wheel bed includes a support and a plurality of wheel assemblies. Each wheel assembly includes a housing having an upper end including a wheel and also having a lower end including a detachable connection for detachably connecting the wheel assembly to the support. A drive mechanism of the press bending station provides rotational driving of the wheel of each wheel assembly upon connection thereof to the support. A lower mount of the press bending station provides support for a lower press ring having a curved shape facing upwardly and being received within the wheel bed below the wheels of the wheel assemblies in a ring shape thereof where no wheel assemblies are located. An upper mount of the press bending station supports an upper press mold having a downwardly facing curved forming face complementary to the upwardly curved shape of the lower press ring. An actuator of the press bending station provides relative vertical movement between the wheel bed and the lower press ring and between the lower press ring and the upper press mold to move the heated glass sheet above the wheel bed and into pressing engagement between the lower press ring and the upper press mold to press bend the glass sheet.

In one embodiment of the press bending station, the wheel bed has a curved shape transverse to a direction of conveyance along which the wheel bed receives the heated glass sheet which has a prebent curved shape transverse to the direction of conveyance. This embodiment of the press bending station has the support of the wheel bed constructed to include a plurality of rails that extend along the direction of conveyance and have different elevations along a direction transverse to the direction of conveyance to provide the curved shape of the wheel bed.

In another embodiment, the wheel bed has a flat shape along and transverse to the direction of conveyance along which the wheel bed receives the heated glass sheet. This embodiment has the wheel bed constructed to include a plurality of rails that extend along the direction of conveyance and have the same elevation along a direction transverse to the direction of conveyance to provide the flat shape of the wheel bed.

Each of the embodiments of the press bending station has the drive mechanism constructed to include a continuous drive member on each rail for rotatively driving the wheels of the wheel assembly attached to the rails. Each wheel assembly includes a lower drive member rotatably supported on the housing and rotatively driven by the continuous drive member of the associated rail to rotatively drive the wheel of the upper end of the housing. Each wheel assembly includes a drive belt that extends between the lower drive member and the upper wheel of the upper end of the housing to provide the rotary driving of the wheel.

The detachable connection of each wheel assembly includes a clamp that provides the detachable connection thereof to the support.

Another object of the present invention is to provide an improved method for glass sheet press bending job switching.

In carrying out the immediately preceding object, the job switching method of the invention is performed by removing a first lower press ring with a first upwardly facing curved shape within a first ring shaped void in a lower wheel bed having wheel assemblies that have detachable connections to a wheel bed support that provides rotational driving of wheels of the wheel assemblies connected to the support. Any wheel assemblies necessary to provide a second ring shaped void are detached from the wheel bed support so as to receive a second lower press ring with a second upwardly facing curved shape, and any necessary wheel assemblies that are not in the second ring shaped void are attached in the first ring shaped void. A second lower press ring with an upwardly facing curved shape is installed within the second ring shaped void in the lower wheel bed to thereby permit bending of different shapes.

In performing the glass sheet press bending job switching method, some jobs require that a first upper press mold having a downwardly facing curved shape complementary to the first upwardly facing curved shape of the first lower press ring is removed from an upper mount above the wheel bed. Furthermore, a second upper press mold having a downwardly facing curved shape complementary to the second upwardly facing curved shape of the second lower ring mold is installed to complete the job switching in such applications.

The objects, features and advantages of the present invention are readily apparent from the following detailed description of the preferred embodiments when taken in connection with the accompanying drawings.

BRIEF DESCRIPTION OF THE DRAWINGS

FIG. 1 is a side elevational view of a system for press bending glass sheets in accordance with the present invention and which also has capability of facilitating switching from one job to another in accordance with the invention.

FIG. 2 is a cross sectional view through the system along the direction of line 2—2 in FIG. 1 at an exit end of the system furnace and illustrates horizontal and inclined rolls on which each heated glass sheet is conveyed for roll forming prior to exiting the furnace in preparation for press bending.

FIG. 3 is a cross sectional view taken through the system along the direction of line 3—3 in FIG. 1 to illustrate the construction of a press bending station in accordance with the invention as having a lower ring mold and an upper press mold that are movable between the solid and phantom line indicated positions to press bend the initially roll formed glass sheet.

FIG. 11 is a partial sectional view taken along the direction of line 11—11 of FIG. 10 to illustrate the construction of wheel assemblies of the wheel bed and their clamped attachment to an associated rail of the lower wheel bed support.

FIG. 12 is a sectional view taken through the wheel assembly along the direction of line 12—12 in FIG. 11 to illustrate its construction and the manner in which a lower drive member through a continuous drive belt drives an upper wheel of the assembly on which the glass sheets are conveyed.

FIG. 13 is a schematic view that illustrates the manner in which the lower drive member of each wheel is rotatively driven by a continuous drive member of the associated drive mechanism to drive the upper wheel through its associated continuous drive belt.

DETAILED DESCRIPTION OF THE PREFERRED EMBODIMENTS

Figure 4:
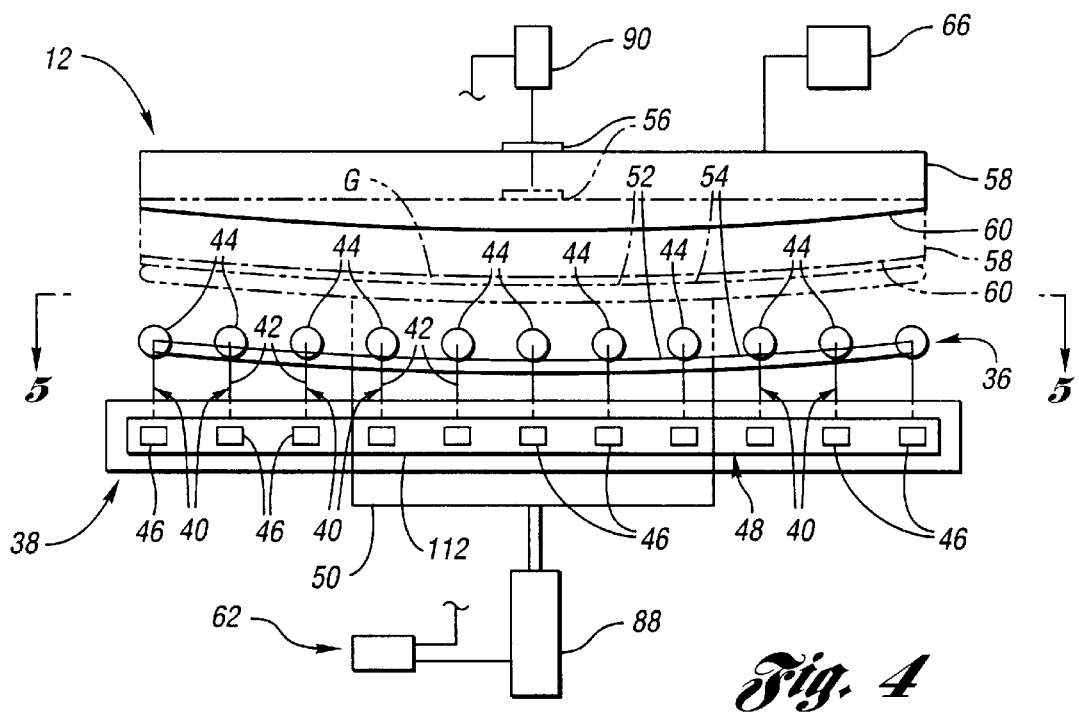
FIG. 4 is a side view of the press bending station taken along the direction of line 4—4 in FIG. 3 to further illustrate its construction.

With reference to FIG. 1 of the drawings, a system 10 for processing glass sheets is generally indicated by 10 and includes one embodiment of a press bending station 12 constructed in accordance with the present invention. Both the press bending station 12 and a method for job switching will be described in an integrated manner to facilitate an understanding of all aspects of the invention.

With continuing reference to FIG. 1, the system 10 includes a furnace 14 having a roll bending station 16 just upwardly along a direction of conveyance C from the press bending station 12. Downstream from the press bending station 12 along the direction of conveyance C, the system 10 is illustrated as including a quench station 18 for providing rapid cooling of a formed glass sheet bent by the roll station 16 and the press station 12 as is hereinafter more fully described.

As illustrated by continuing reference to FIG. 1, the furnace 14 has entry and exit ends 20 and 22 and includes a heating chamber 24 (FIG. 2) having a conveyor 26 for conveying glass sheets along the direction of conveyance through the furnace from the entry end to the exit end. The conveyor 24 on which the glass sheets are heated can be either a conventional gas hearth or a roll conveyor on which the glass sheets are conveyed during heating from ambient temperature to a sufficiently high temperature to permit bending.

The furnace exit end 22 includes the roll bending station 16 which is illustrated in FIG. 2 as having horizontally extending conveyor rolls 28 that are rotatively driven and spaced horizontally within the heating chamber along the direction of conveyance extending laterally with respect thereto to support an convey the heated glass sheets. The roll bending station 16 also includes a pair of sets 30 of bending rolls 32, with the bending roll sets 30 spaced laterally with respect to each other within the heating chamber 24 along the direction of conveyance. Each set of bending rolls 30 is supported and rotatively driven by a drive mechanism 34 with the bending rolls at progressively increasing inclinations along the direction of conveyance as illustrated by reference numerals $32_a$, $32_b$, $32_c$ and $32_d$ in FIG. 2. The conveyance of each heated glass sheet G along the direction of conveyance in cooperation with the bending rolls 32 provides bending of the glass sheet along a direction transverse to the direction of conveyance as illustrated in FIG. 2.

With combined reference to FIGS. 1 and 3–5, the press bending station 12 as previously mentioned is located externally of the furnace 14 downstream from its exit end 22 to receive the roll bent glass sheets from the roll bending station 16. More specifically, the press bending station 12 includes a lower wheel bed 34 for receiving a heated glass sheet to be press bent. The lower wheel bed 34 includes a lower support 38 and a plurality of wheel assemblies 40. Each wheel assembly 40 as is hereinafter more fully described includes a housing 42 having an upper end including a wheel 44 and having a lower end including a detachable connection 46 for detachably connecting the wheel assembly to the support 38. As is hereinafter more fully described in connection with FIGS. 10–13, a drive mechanism 48 (FIG. 10) provides rotational driving of the wheel of each wheel assembly 40 upon connection thereof to the support 38 as is hereinafter more fully described.

Figure 5:
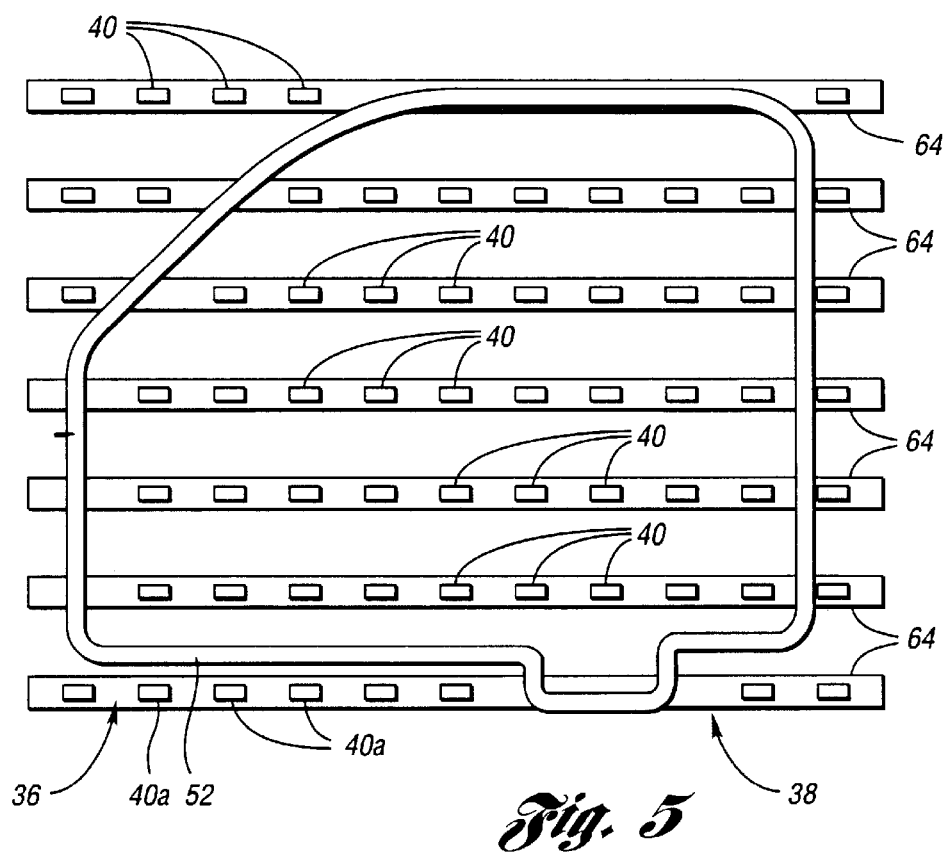
FIG. 5 is a top plan view taken along the direction of line 5—5 in FIG. 4 to illustrate the manner in which the lower press ring is received by a wheel bed that receives the roll formed glass sheet from the roll bending station prior to the press bending.

As illustrated in FIG. 3, a lower mount schematically illustrated at 50 supports a lower press ring 52 having a curved shape 54 facing upwardly and being received within the wheel bed 34 below the wheels 44 of the wheel assemblies 40 in a ring shape thereof where no wheel assemblies are located as best illustrated in FIG. 5. As illustrated in FIG. 3, an upper mount 56 of the press station 12 supports an upper press mold 58 having a downwardly facing curved forming face 60 complementary to the upwardly curved shape 54 of the lower press ring 52.

An actuator collectively indicated by 62 in FIGS. 3 and 4 provides relative vertical movement between the wheel bed 36 and the lower press ring 52 and between the lower press ring and the upper press mold 58 to move the heated glass sheet above the wheel bed and into pressing engagement between the lower press ring and the upper press mold to press bend the glass sheet.

With the embodiment of the press bending station 12 as illustrated by FIGS. 1–5 and described above, the wheel bed 36 has a curved shape transverse to the direction of conveyance along which the wheel bed receives the heated glass sheet corresponding to the prebent curved shape transverse to the direction of conveyance as provided by the roll bending station 16 illustrated in FIGS. 1 and 2. More specifically, the support 38 of the wheel bed 36 includes a plurality of rails 64 that extend along the direction of conveyance and have different elevations as shown in FIG. 3 along a direction transverse to the direction of conveyance to provide the curved shape of the wheel bed.

Figure 6:
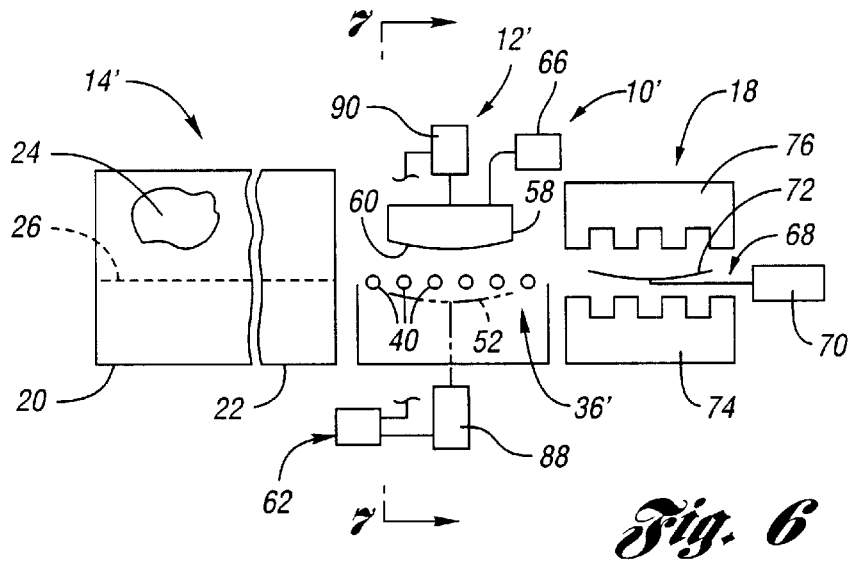
FIG. 6 is a side elevational view of another embodiment of the system whose press bending station receives and forms flat glass sheets in accordance with the invention.
Figure 7:
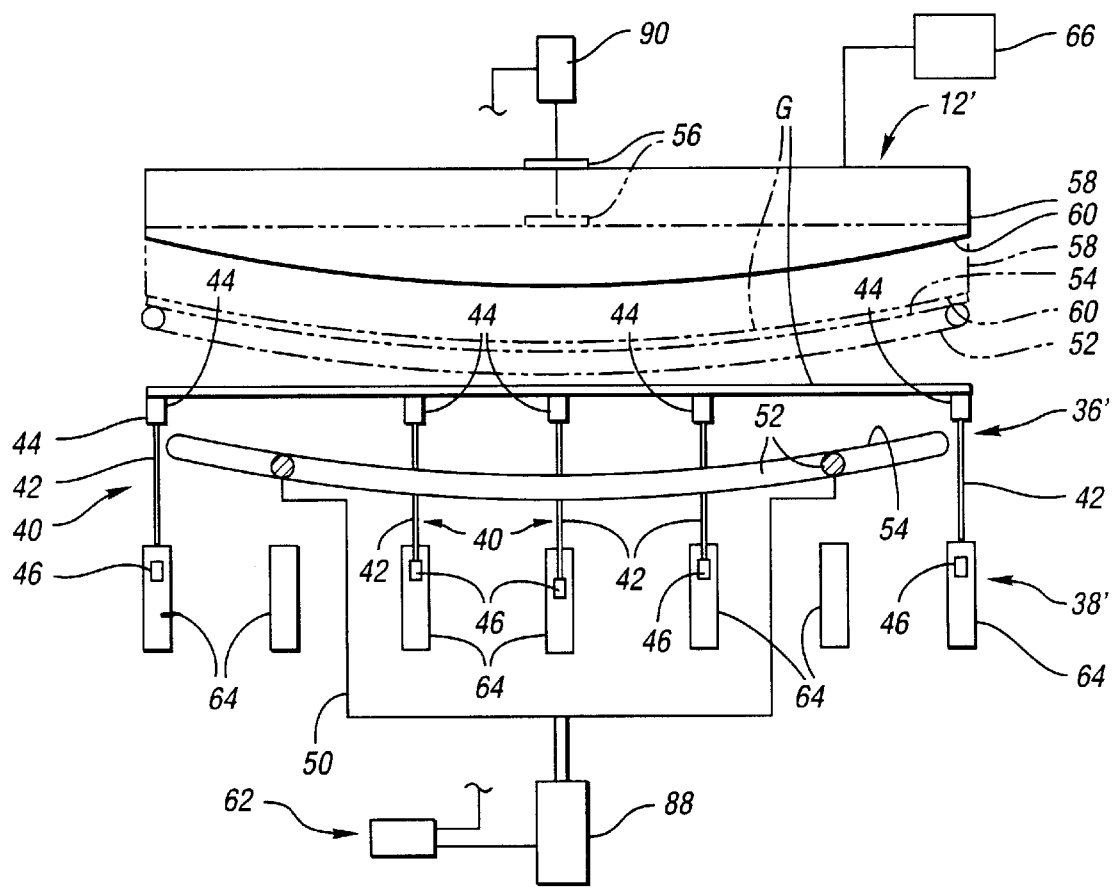
FIG. 7 is a cross sectional view taken along the direction of line 7—7 in FIG. 6 to further illustrate the flat shape of the glass sheets prior to the press bending.

With reference to FIGS. 6 and 7, another embodiment of the glass processing system is generally indicated by 10' and its press bending station 12' has the same construction as the previously described embodiment except as will be noted such that like components have the same reference numerals and most of the previous description is applicable and thus will not be repeated. However, in the system 10' the furnace 14' heats flat glass sheets and provides conveyance thereof to the press bending station 12' without any roll bending as previously described such that the glass sheets have a flat shape without any prebending upon being delivered to the press station. Thus, the wheel bed 36' as shown in FIGS. 6 and 7 has a flat shape along and transverse to the direction of conveyance C along which the wheel bed receives the heated glass sheet. More specifically, the support 38' of the wheel bed 36 has its rails 64 extending along the direction of conveyance and having the same elevations along a direction transverse to the direction of conveyance to provide the flat shape of the wheel bed.

With reference to FIGS. 1 and 6, each embodiment of the press bending station 12 (FIG. 1) and 12' (FIG. 6) may have the lower press ring 52 and the forming face 60 of the upper press mold 58 provided with a straight shape along the direction of conveyance C or with a curved shape along that direction in order to provide bending in both along and transverse to the direction of conveyance. The upper press mold 58 has its forming face 60 provided with a vacuum from a vacuum source 66 so as to support the bent glass sheet after the press bending. Upon upward movement of the upper press mold 58, a shuttle 68 of the quench station 18 is moved by an actuator 70 to move a quench ring 72 toward the left below the upper press mold 58. Termination of the vacuum provided by the vacuum source 66 may then be accompanied by the supply of pressurized gas to the upper press mold surface 60 to release the glass sheet onto the quench ring 72 and the shuttle actuator 70 then moves the shuttle 68 back toward the right to the position illustrated such that the quench ring 72 and the formed glass sheet thereon are located between lower and upper quench heads 74 and 76 which respectively supply upwardly and downwardly directed quenching gas that rapidly cools the glass sheet to provide toughening thereof that increases its mechanical strength.

It should be appreciated that while both the embodiments 12 and 12' of the press station illustrated are illustrated as being utilized with quench stations, it is also possible for the press bending in accordance with the invention to be performed with annealing such as is the case when manufacturing laminated windshields for vehicles.

Figure 8:
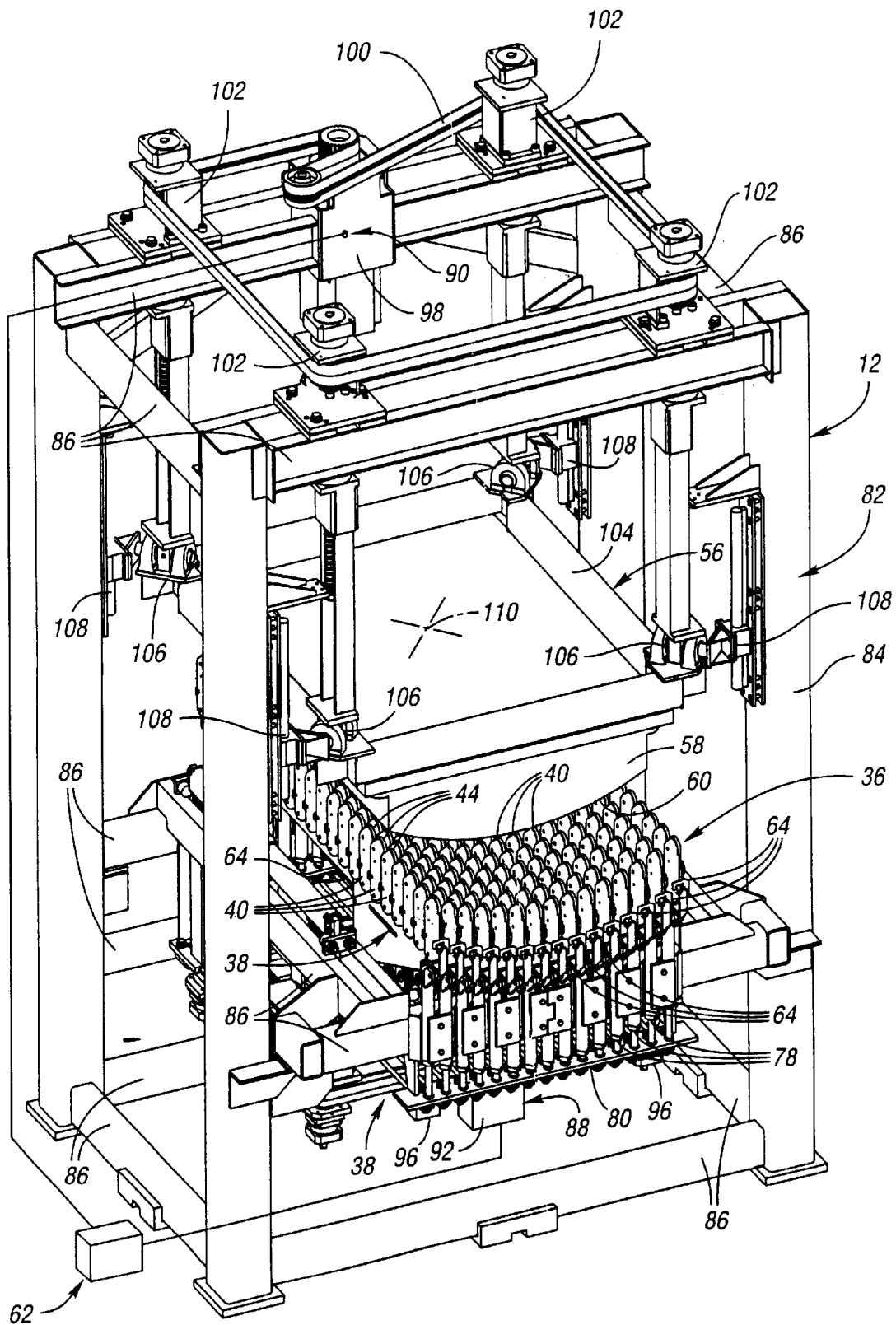
FIG. 8 is a perspective view of the embodiment of the press bending station illustrated in FIGS. 1–5 where the lower wheel bed has a curved shape and, other than that curved shape, the illustration thereof is also applicable to the embodiment of FIGS. 6 and 7 where the lower wheel bed has a flat shape.
Figure 9:
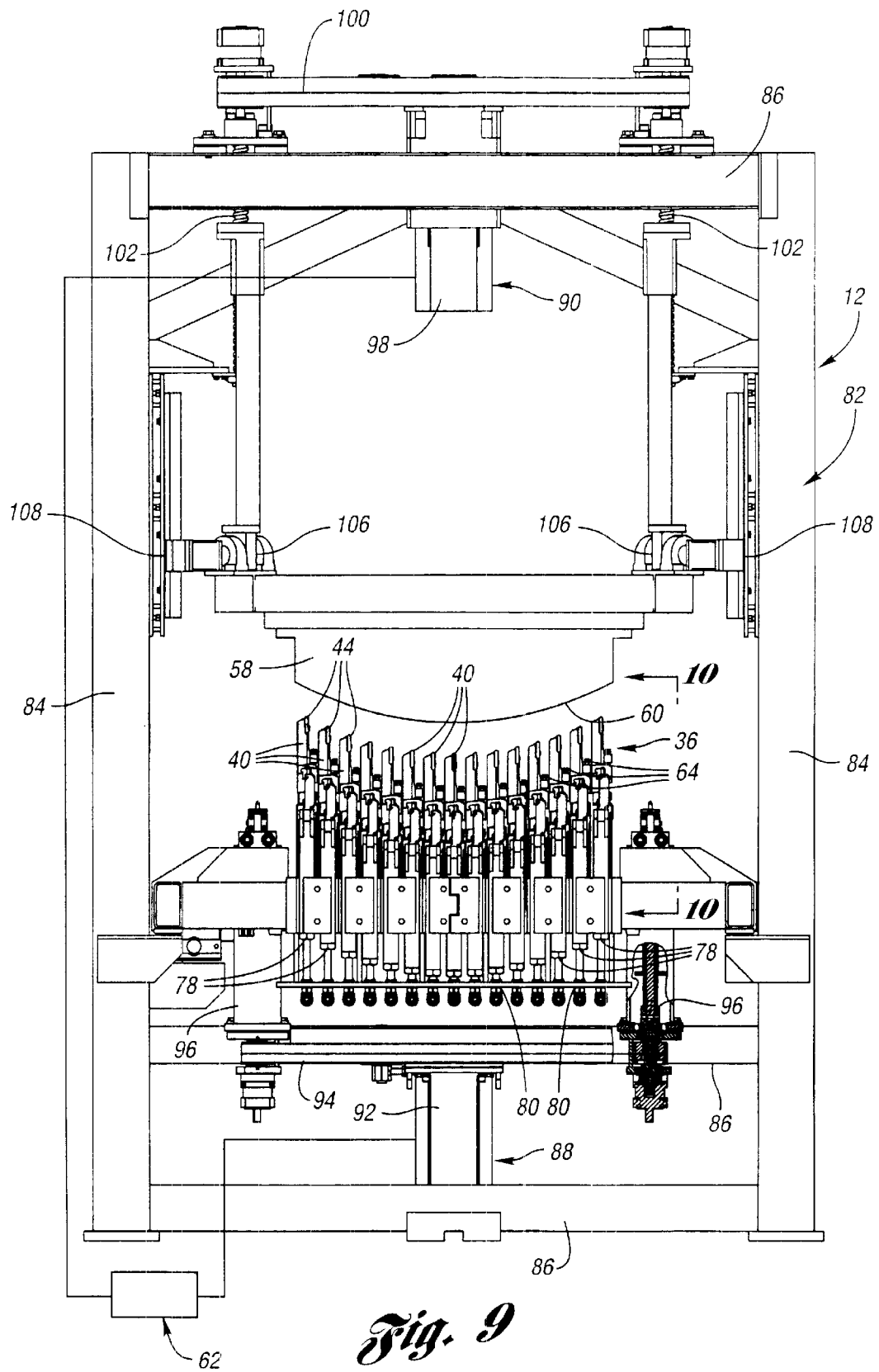
FIG. 9 is a cross sectional view through the press bending station taken in the same direction as FIG. 3 to further illustrate the press station construction.

With reference to FIGS. 8 and 9, the press bending station 12 illustrated is shown with its lower wheel bed 36 having a curved shape transverse to the direction of conveyance. Threaded adjusters 78 support the rails 64 on which the wheel assemblies 40 are mounted and are adjustable so that the lower wheel bed can have the curved shape as illustrated or a flat shape as illustrated in FIG. 7 and as described above. More specifically, the threaded adjusters support the rails 64 on a lower base 80 of the lower support 38.

With continuing reference to FIGS. 8 and 9, the press bending station 12 includes a framework collectively indicated by 82 and having vertical posts 84 connected by horizontal beams 86. The vertical actuator 62 previously described in connection with FIGS. 3 and 7 includes a lower vertical operator 88 for moving the lower press ring 52 vertically relative to the lower wheel assembly 36 and also includes an upper vertical operator 90 for moving the upper press mold 58 vertically relative to the framework 84 and the lower press ring. More specifically, the lower vertical operator 88 includes an electric motor 92 whose output drives a belt 94 that operates ball screws 96 that are mounted on lower beams 86 and connected to the lower press ring mount 50 (FIG. 3) to provide the vertical movement of the lower press ring 52 previously described and illustrated in FIGS. 3 and 7. Furthermore, the upper vertical operator 90 includes an electric motor drive 98 whose output drives a belt 100 that drives ball screws 102 that move a rectangular frame 104 of the upper mount 56 on which the upper press mold 58 is mounted. More specifically, the ball screws 102 are mounted on upper beams 86 and extend downwardly to support slide connections 106 on the corners of the upper press mold mount frame 104. These slide connections 106 are connected to slide guides 108 on the vertical posts 84 such that the ball screw actuation provides guided vertical movement of the upper press mold frame mount 104. The slide connections 106 at diagonally opposite corners are slidable about aligned axes that intersect at a thermally stable center 110 about which the upper press mold 58 expands and contracts upon heating and cooling so as to insure accuracy in the location of the shape about which the bending takes place.

The press bending station 12 can be supported on the factory floor for movement into position within the glass processing system by air float supports. A roller guide rail may be used to guide the quench station during the movement into position. Air actuated pins received within holes can be utilized to provide positioning, with a center pin received within a round hole at the thermal center of the upper press mold and with a pair of slot shaped holes on opposite sides of the center pin to allow for thermal expansion while ensuring the proper angular alignment about the center pin.

Also, for some production jobs that are repeatedly done intermittently with other jobs, is may be desirable to have dedicated press bending stations for each job and to switch the press bending stations for the job changes.

Also, for some production jobs that are repeatedly done on an intermittent with other jobs, it may be desirable to have dedicated press bending stations for each job and to switch the press bending stations for the job changes.

Figure 10:
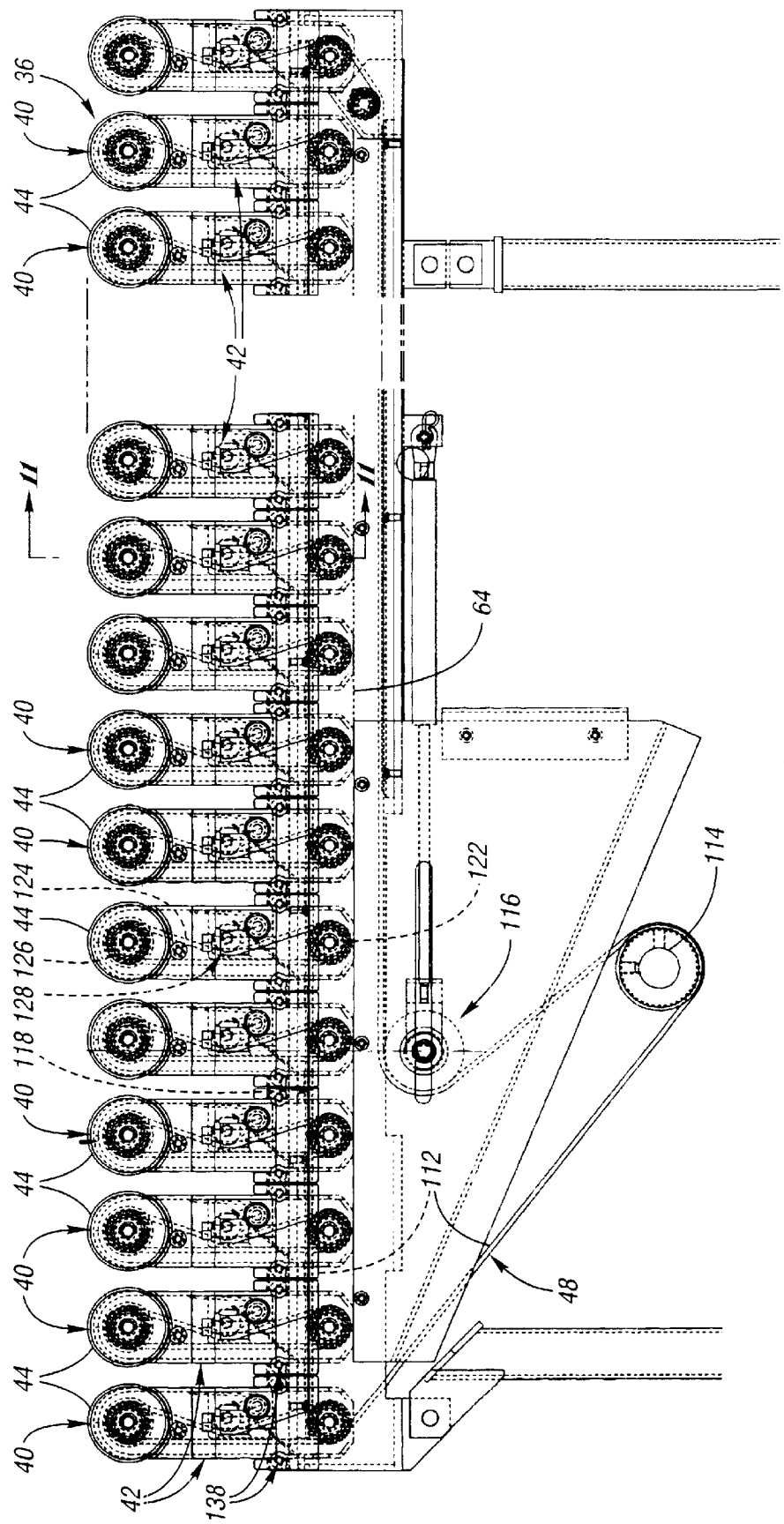
FIG. 10 is a side view taken along the direction of line 10—10 in FIG. 9 to illustrate the construction of the lower wheel bed and wheel assemblies thereof that are mounted on an associated rail of a lower support of the bed.

The drive mechanism 48 of the lower wheel bed 36 as illustrated schematically in FIG. 4 is further illustrated in FIG. 10 as including a continuous drive member 112 on each rail 64. A suitable electric motor drive has an output 114 that drives all of the drive members 112 each of whose tension is controlled by a tension adjuster generally indicated by 116. The drive member 112 extends to the opposite ends of the lower support member rails 64 and has an upper drive reach 118 that rotatively drives the wheel assemblies 40 as is hereinafter more fully described.

As illustrated by additional reference to FIGS. 11–13, each wheel assembly 40 includes the housing 42 previously mentioned. A lower drive member 122 of each wheel assembly is rotatably supported on the housing and rotatively driven by the continuous drive member 112 of the associated rail 64 by engagement of the lower drive member with the driving reach 118. A drive belt 124 of each wheel assembly 40 extends around the lower drive member 122 and over an upper drive gear 126 of the associated wheel 44 to provide rotational driving of the wheel 44 via the impetus provided by the driving reach 118 of drive member 112. A spring biased tension adjuster 128 of each housing provides proper tensioning of the drive belt 124. The drive member 122 as shown in FIG. 13 has a first drive gear 130 that is driven by the driving reach 118 of the drive member 112 and has a second drive gear 132 that drives the drive belt 124. The lower drive member 122 is rotatably mounted by a shaft 134 on a lower end of the housing 120, while the upper drive gear 126 and the wheel 44 are rotatably mounted by a shaft 136 on the upper end of the housing. Each wheel 44 as shown in FIG. 11 has an annular outer surface 45 of a generally pointed shape for contacting the glass sheet generally at a point regardless of the prebent curved shape of the glass sheet.

As shown in FIGS. 11 and 12, each wheel assembly 40 includes a clamp 138 that provides clamping thereof to the associated rail 64. More specifically, the housing includes side slots 140 that receive an upper flange 142 of the associated rail 64 and a clamp member 144 has a pair of legs 146 of hook shapes that extend over clamp lugs 148 of the housing 120 as well as having a clamp leg 150 that engages a vertical wall 152 of the associated rail 64 as shown in FIG. 11. The housing has a lug 154 that receives a threaded bolt 156 that is engaged with the clamp member 154 upon threading to provide the clamped relationship illustrated. Upon such connection, the driving reach 118 of the drive member 112 associated with the rail 64 is engaged with the lower drive member 122 to provide the driving connection of the wheel 44. Unclamping of the clamp 138 and removal of the wheel assembly thus provides detachment from the drive mechanism.

Figure 14:
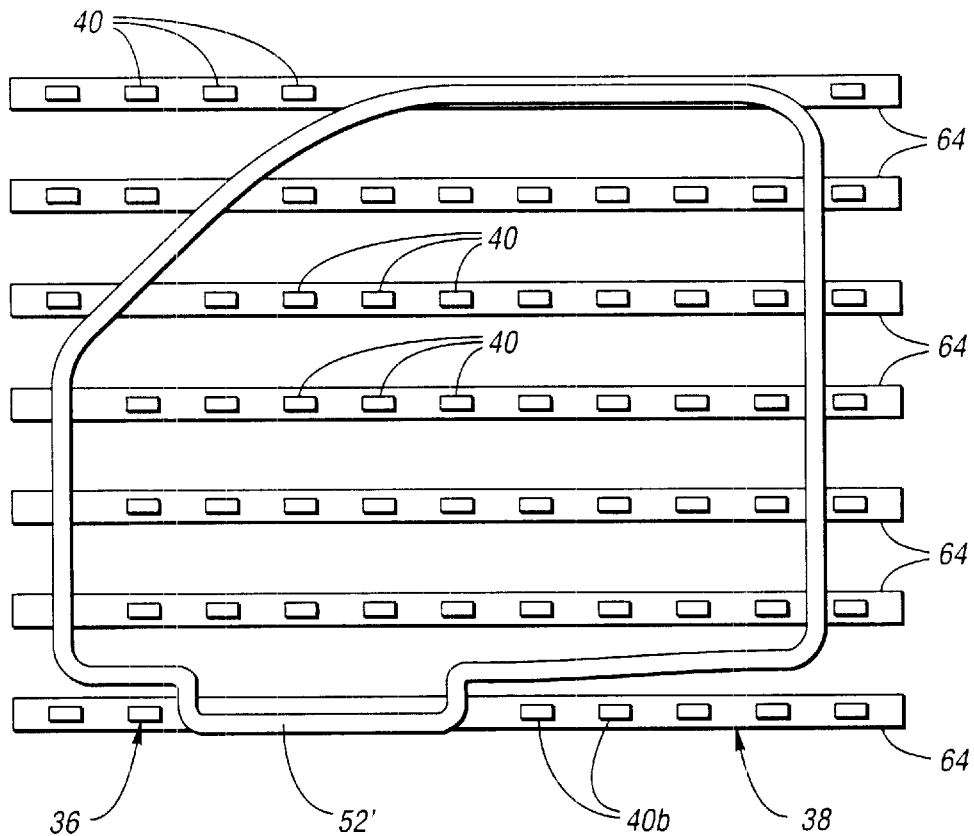
FIG. 14 is a top plan view taken in the same direction as FIG. 5 to illustrate the manner in which wheel assemblies of the lower wheel bed are removed and others attached to provide a different lower ring shape void for switching from one job to the next.

With reference to FIGS. 5 and 14, the invention also contemplates a method for glass sheet press bending job switching that is performed to switch the press bending station from one production job to another. In doing so, the process begins with the first lower press ring 52 shown in FIG. 5 which is received within a first ring shaped void in the lower wheel bed 36 where no wheel assemblies 40 are located within the shape of the ring. This first lower press ring 52 is removed and another lower press ring 52' as illustrated in FIG. 14 is installed within a second ring shaped void that is provided by removing any necessary wheel assemblies 40 and attaching the wheel assemblies necessary to fill the first ring shaped void where it does not overlap with the second ring shaped void. Thus, the wheel assemblies identified by $40_a$ in FIG. 5 are removed upon switching from the lower press ring 52 shown in FIG. 5 to the lower press ring 52' shown in FIG. 14 and the wheel assemblies $40_b$ are added as shown in FIG. 14. The removal and attachment of the wheel assemblies to and from the rails 64 is provided by the clamping and unclamping of the clamps 138 illustrated in FIG. 11 as previously described.

Figure 15:
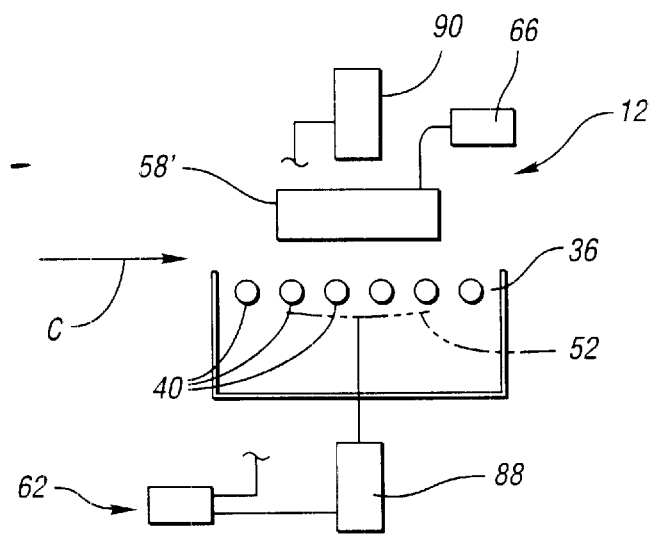
FIG. 15 is an elevational view of the press bending station that illustrates the manner in which the upper press mold can also be switched in addition to the lower press ring when switching from one production job to the next.

With reference to FIG. 15, the job switching described above in some instances can utilize the same upper press mold for different ring shapes if there is the same extent of curvature. However, in some instances, it is also necessary to remove the previously used upper press mold and to install a second upper press mold 58' which has a different curvature either transverse to the direction of conveyance and/or along the direction of curvature.

Another system incorporating the press bending station, a roll bending station that can be used with the press bending station, and a quench station for quenching the glass sheets are respectively disclosed in U.S. patent application Ser. No. 09/884,848; Ser. No. 09/884,394; and Ser. No. 09/884,843, which were all filed concurrently herewith and the entire disclosures of which are hereby incorporated by reference.

While the preferred embodiments for practicing the invention have been described in detail, those familiar with the art to which this invention relates will recognize various alternative modes and ways of practicing the invention as defined by the following claims.

What is claimed is:

1. A press bending station for press bending heated glass sheets comprising:

a lower wheel bed for receiving a heated glass sheet to be press bent, the lower wheel bed including a support and a plurality of wheel assemblies, and each wheel assembly including a housing having an upper end including a wheel and also having a lower end including a detachable connection for detachably connecting the wheel assembly to the support;

a drive mechanism for providing rotational drive of the wheel of each wheel assembly upon connection thereof to the support;

a lower mount for supporting a lower press ring having a curved shape facing upwardly and being received within the wheel bed below the wheels of the wheel assemblies in a ring shape thereof where no wheel assemblies are located;

an upper mount for supporting an upper press mold having a downwardly facing curved forming face complementary to the upwardly curved shape of the lower press ring; and an actuator for providing relative vertical movement between the wheel bed and the lower press ring and between the lower press ring and the upper press mold to move the heated glass sheet above the wheel bed and into pressing engagement between the lower press ring and the upper press mold to press bend the glass sheet.

2. A press bending station as in claim 1 wherein the wheel bed has a curved shape transverse to a direction of conveyance along which the wheel bed receives the heated glass sheet which has a prebent curved shape transverse to the direction of conveyance.

3. A press bending station as in claim 2 wherein the support of the wheel bed includes a plurality of rails that extend along the direction of conveyance and have different elevations along a direction transverse to the direction of conveyance to provide the curved shape of the wheel bed.

4. A press bending station as in claim 1 wherein the wheel bed has a flat shape along and transverse to a direction of conveyance along which the wheel bed receives the heated glass sheet.

5. A press bending station as in claim 4 wherein the support of the wheel bed includes a plurality of rails that extend along the direction of conveyance and have the same elevations along a direction transverse to the direction of conveyance to provide the flat shape of the wheel bed.

6. A press bending station as in claim 3 or 5 wherein the drive mechanism includes a continuous drive member on each rail for rotatively driving the wheels of the wheel assemblies attached to the rails.

7. A press bending station as in claim 6 wherein each wheel assembly includes a lower drive member rotatably supported on the lower end of the housing and rotatively driven by the continuous drive member of the associated rail to rotatively drive the wheel of the upper end of the housing.

8. A press bending station as in claim 7 wherein each wheel assembly includes a drive belt that extends between the lower drive member and the wheel of the upper end of the housing to provide the rotary driving of the wheel.

9. A press bending station as in claim 1 wherein the detachable connection of each wheel assembly includes a clamp that provides the detachable connection to the support.

10. A press bending station for press bending heated glass sheets comprising:

a lower wheel bed for receiving a heated glass sheet to be press bent upon movement thereof along a direction of conveyance, the lower wheel bed including a support and a plurality of wheel assemblies on which the lower wheel bed receives the heated glass sheet to be press bent, the support of wheel bed including a plurality of rails that extend parallel to each other along the direction of conveyance and spaced laterally to each other along the direction of conveyance, and each wheel assembly including a housing having an upper end including a wheel and also including a lower end having a rotatably mounted lower drive member, a drive belt that extends between the wheel and the lower drive member to provide rotary driving of the wheel, and a clamp for detachably connecting the housing of the wheel assembly to one of the rails of the support;

a drive mechanism including a continuous drive member on each rail for providing rotational drive of the lower drive members and hence the wheels of the wheel assemblies upon connection thereof to the rail;

a lower mount for supporting a lower press ring having a curved shape facing upwardly and being received within the wheel bed below the wheels of the wheel assemblies in a ring shape thereof where no wheel assemblies are located;

an upper mount for supporting an upper press mold having a downwardly facing curved forming face complementary to the upwardly curved shape of the lower press ring; and an actuator for moving the lower press ring upwardly and for moving the upper press mold downwardly to move the heated glass sheet above the wheel bed and into pressing engagement between the lower press ring and the upper press mold to press bend the glass sheet.

11. A glass sheet press bending job switching method, comprising:

removing a first lower press ring with a first upwardly facing curved shape received within a first ring shaped void in a lower wheel bed having wheel assemblies that have detachable connections to a wheel bed support that provides rotational driving of wheels of the wheel assemblies connected thereto;

detaching from the wheel bed support any wheel assemblies necessary to provide a second ring shaped void for receiving a second lower press ring with a second upwardly facing curved shape and attaching wheel assemblies to the wheel bed support in the first ring shape void but not in the second ring shaped void; and installing a second lower press ring within the second ring shaped void in the lower wheel bed.

12. A glass sheet press bending job switching method as in claim 11 wherein a first upper press mold having a downwardly facing curved shape complementary to the first upwardly facing curved shape of the first lower press ring is removed from an upper mount above the wheel bed, and installing a second upper press mold having a downwardly curved shape complementary to the second upwardly facing curved shape of the second lower ring mold.

* * * * *